United States Patent [19]

McCormack et al.

[11] Patent Number: 5,181,171
[45] Date of Patent: Jan. 19, 1993

[54] ADAPTIVE NETWORK FOR AUTOMATED FIRST BREAK PICKING OF SEISMIC REFRACTION EVENTS AND METHOD OF OPERATING THE SAME

[75] Inventors: Michael D. McCormack, Plano, Tex.; Alan D. Rock, Knoxville, Tenn.

[73] Assignee: Atlantic Richfield Company, Los Angeles, Calif.

[21] Appl. No.: 585,967

[22] Filed: Sep. 20, 1990

[51] Int. Cl.$^5$ .............................................. G06F 15/18
[52] U.S. Cl. ..................................... 364/421; 395/22; 395/929; 367/9; 367/14; 367/21
[58] Field of Search ....................... 364/513, 421, 420; 367/9, 14, 15, 21, 24, 25, 34, 36, 37, 38, 54, 68; 395/22, 929

[56] References Cited

U.S. PATENT DOCUMENTS

| | | | |
|---|---|---|---|
| 4,101,867 | 7/1978 | Martin | 367/54 |
| 4,236,233 | 11/1980 | Davis, Jr. et al. | 367/38 |
| 4,609,471 | 1/1978 | Silverman | 367/54 |
| 4,663,743 | 5/1987 | Rampuria et al. | 367/68 |
| 4,692,909 | 9/1987 | Gard et al. | 364/421 |
| 4,695,984 | 9/1987 | Paal | 367/36 |
| 4,725,992 | 2/1988 | McNatt et al. | 364/421 |
| 4,876,673 | 10/1989 | McCowan | 364/421 |
| 4,876,731 | 10/1989 | Loris et al. | |
| 4,912,647 | 3/1990 | Wood . | |
| 4,912,649 | 3/1990 | Wood . | |
| 4,912,651 | 3/1990 | Wood et al. . | |
| 4,912,652 | 3/1990 | Wood . | |
| 4,912,653 | 3/1990 | Wood . | |
| 4,912,654 | 3/1990 | Wood . | |
| 4,912,655 | 3/1990 | Wood . | |
| 4,914,603 | 4/1990 | Wood . | |
| 4,964,087 | 10/1990 | Widrow | 364/421 |
| 4,984,220 | 1/1991 | Bodine et al. | 364/421 |
| 4,985,873 | 1/1991 | Eyl et al. | 367/34 |
| 5,001,677 | 3/1991 | Masters | 367/68 |

OTHER PUBLICATIONS

Malferrari et al., "An Application of Neural Networks to Oil Well Drilling", *INNC 90 Paris Internal Neural Network Conf.* vol. 1, pp. 127-130.
Bitto et al., "Setsmic Event Discrimination Using Neural Networks", *23rd Asilomar Conference on Signals, Systems, and Computers,* vol. 1, 1989 pp. 326-330.
Liv, "A Rule-Based System for Automatic Seismic Discrimination", *Pattern Recognition,* vol. 18, No. 6, 1985 pp. 459-463.

(List continued on next page.)

*Primary Examiner*—Allen R. MacDonald
*Attorney, Agent, or Firm*—Vinson & Elkins

[57] ABSTRACT

An adaptive, or neural, network and a method of operating the same is disclosed which is particularly adapted for performing first break analysis for seismic shot records. The adaptive network is first trained according to the generalized delta rule. The disclosed training method includes selection of the seismic trace with the highest error, where the backpropagation is performed according to the error of this worst trace. The learning and momentum factors in the generalized delta rule are adjusted according to the value of the worst error, so that the learning and momentum factors increase as the error decreases. The training method further includes detection of slow convergence regions, and methods for escaping such regions including restoration of previously trimmed dormant links, renormalization of the weighting factor values, and the addition of new layers to the network. The network, after the addition of a new layer, includes links between nodes which skip the hidden layer. The error value used in the backpropagation is reduced from that actually calculated, by adjusting the desired output value, in order to reduce the growth of the weighting factors. After the training of the network, data corresponding to an average of the graphical display of a portion of the shot record, including multiple traces over a period of time, is provided to the network. The time of interest of the data is incremented until such time as the network indicates that the time of interest equals the first break time. The analysis may be repeated for all of the traces in the shot record.

10 Claims, 7 Drawing Sheets

OTHER PUBLICATIONS

Zhu et al., "Training Neural Networks for Elg Feature Recognition", *INNC 90 Internat. Neural Network Conf.* vol. 1, pp. 137–140.

Coppen, "First Arrival Piciling on Common-Offset Trace Collections for Automatic Estimation of Static Corrections", *Geophysical Prospecting* 33, 1212–31, 1985.

Olsen, "A Stable and Flexible Procedure for the Inverse Modelling of Seismic First Arrivals", *Geophysical Prospecting* 37, 455–65, 1989.

Spagnolini, "Adaptive Picking of Refracted First Arrivals", *Geophysical Prospecting* 39, 293–312, 1991.

Epping et al., "A Neural Network for Analysis and Improvement of Gas Well Production", *Proc. 1990 Summer Computer Simulation Conf.*, pp. 791–796.

Caudill, "Neural Networks Primer, Part I", *AI Expert* (Dec. 1987), pp. 46–55.

Caudill, "Neural Networks Primer, Part II", *AI Expert* (Feb. 1988), pp. 55–67.

Caudill, "Neural Networks Primer, Part III", *AI Expert* (Jun. 1988), pp. 53–65.

Wasserman et al., "Neural Networks, Part 1", *IEEE Expert* (1987), pp. 10–14.

Wasserman et al., "Neural Networks, Part 2", *IEEE Expert* (1988), pp. 10–15.

Lippmann, "An Introduction to Computing with Neural Nets", *IEEE ASSP Magazine* (Apr. 1987), pp. 4–24.

Veezhinathan et al., "A Neural Network Approach to First Break Picking", *International Joint Conference of Neural Networks*, vol. I (San Diego, Calif., Jun. 17–21, 1990), pp. 235–240.

Gelchinsky et al., "Automated Picking of First Arrivals and Parameterization of Travel Time Curves", *Geophysical Prospecting* 31 (1983), pp. 915–928.

Ervin et al., "Automated Analysis of Marine Refraction Data: A Computer Algorithm", *Geophysics*, vol. 48, No. 5 (May 1983), pp. 582–589.

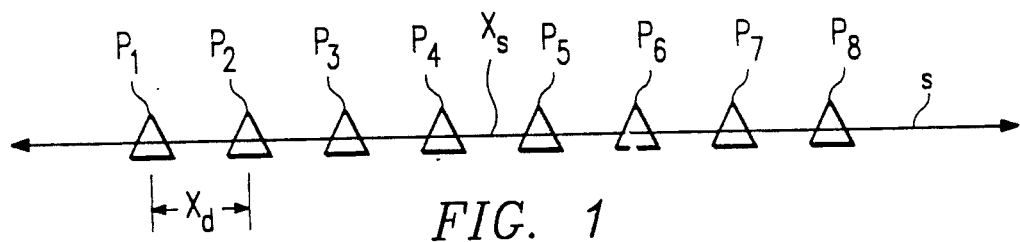
FIG. 1
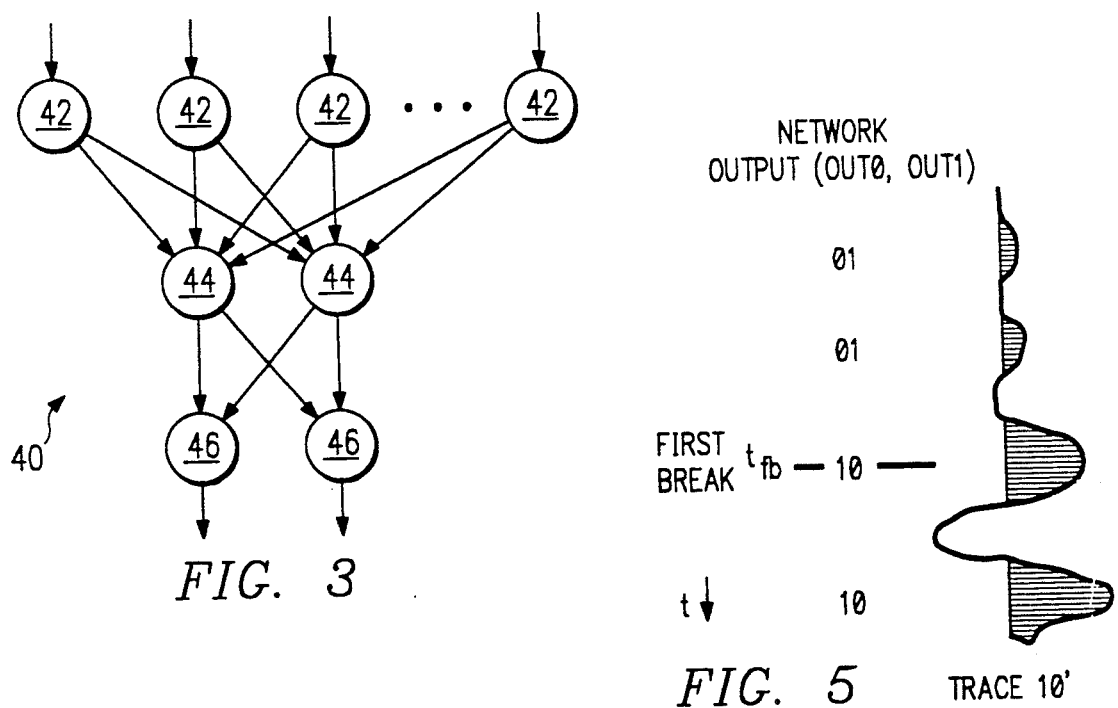
FIG. 3
FIG. 5
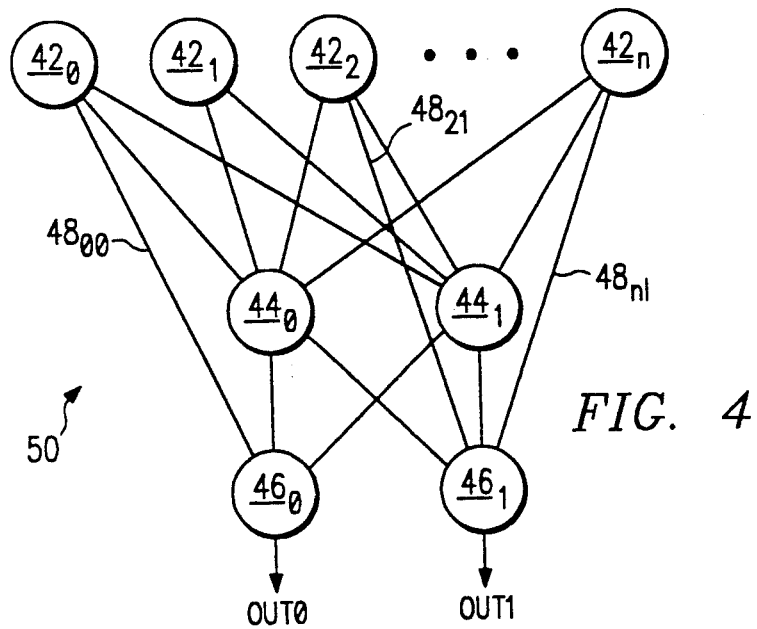
FIG. 4

ADAPTIVE NETWORK FOR AUTOMATED FIRST BREAK PICKING OF SEISMIC REFRACTION EVENTS AND METHOD OF OPERATING THE SAME

This invention is in the field of seismic prospecting, and is specifically directed to automated seismic data processing in such prospecting.

BACKGROUND OF THE INVENTION

The prospecting for underground oil and gas reservoirs is often performed by the use of seismic vibrations and waves which are intentionally input into the earth at a source location, and which are detected at remote locations by geophones (in the case of prospecting on land) or hydrophones (for offshore prospecting) The travel times of vibrations from the source to the detection locations is indicative of the depth of various geological features such as interfaces between sub-surface strata, and the presence of hydrocarbon reservoirs thereat, from which the seismic waves reflect.

Distortions in the waves during transmission through the earth makes the recognition of the travel times more difficult. Particularly in land-based prospecting, a significant source of distortion is the near-surface layer. The near-surface distortion is due in large part to the weathering of the material in this layer; the soil and rocks near the surface are affected by ice, frost, water, temperature and wind to a greater degree than are the soil and rocks at greater depths from the surface. Accordingly, the near-surface layer distorts seismic waves and vibrations traveling therethrough, with the weathering effects described above presenting distortion due to lateral changes in velocity within this layer, lateral changes in the thickness of this layer, or both.

In order to accurately determine the travel time of the deep reflected waves, correction for this distortion caused by the near-surface layers must be done. A common technique for such correction uses a measurement of the velocity of refracted waves in the near-surface layer (i.e., traveling directly from the source to the detection locations along the near-surface strata, without reflecting from deeper sub-surface strata). The measured travel times of these refracted waves can be used to define a near-surface velocity model by conventional techniques. This velocity model is then used to perform conventional static corrections to the measured vibrational waves from deep reflections. These static corrections will account for distortion from the weathered near-surface layer, and will improve the accuracy of the seismic survey.

Such correction for the near-surface effects is conventionally performed by analysis of seismic traces from the surface geophones, in the land-based example. These conventional seismic traces are generally manually analyzed to identify the so-called "first break" point for each trace. These first breaks in the traces correspond to the first detection by the geophones of the source wave, and accordingly may be used to determine the velocity of the refracted waves through the near surface layer.

However, identification of the first break in a trace is not always straightforward, due to the distortion in the weathered near-surface layer as described above. Secondly, manual analysis of large numbers of traces (on the order of 100 traces for each seismic shot record, and tens or hundreds of shot records in a seismic survey), is heavily labor intensive. While certain redundancies are present in the traces which could be utilized to correct erroneous first picks, for example by creating and analyzing groups of traces (or "gathers") with common offset or common receiver, the heavy labor required for the primary analysis precludes exploitation of the redundancies available in the data.

Clearly, due to the large amount of data, automation of the first break analysis is quite desirable. Various techniques have been proposed for the automation of first break picking from, or other analysis of, large numbers of seismic traces. Examples of these techniques are described in Ervin et al., "Automated analysis of marine refraction data: A computer algorithm", *Geophysics*, Vol. 48, No. 5 (May 1983), pp. 582-589; and Gelchinsky et al., "Automatic Picking of First Arrivals and Parameterization of Traveltime Curves", *Geophysical Prospecting* 31 (1983), pp. 915-928. These prior techniques have been based on statistical and mathematical features of the seismic signals such as running averages of the trace slope and statistical treatment of the signals' correlation properties. However, due to variations in the quality of the seismic signals along the seismic profile and to other factors, the performance of these prior techniques is questionable.

It is therefore an object of this invention to provide a method and apparatus for automated first break picking which uses an adaptive computer network such as a neural network.

Neural networks refer to a class of computations that can be implemented in computing hardware, or more frequently computer programs implemented on conventional computing hardware, organized according to what is currently believed to be the architecture of biological neurological systems. The distinguishing feature of neural networks is that they are arranged into a network of elements, mimicking neurodes of a human brain. In such networks, each element performs a relatively simple calculation, such as a weighted sum of its inputs applied to a non-linear function, such as a sigmoid, to determine the state of the output. Increased power of computation comes from having a large number of such elements interconnected to one another, resulting in a network having both parallel and sequential arrangements of computational elements. Proper setting of the weighting factors for each of the elements allows the network to perform complex functions such as image recognition, solving optimization problems, and the like.

The programming of conventional computer systems to operate as an artificial neural network is well known in the art, as described in Y. H. Pao, *Adaptive Pattern Recognition and Neural Networks*, (Addison-Wesley Publishing Company, New York, 1989), incorporated herein by this reference. As described therein, such programming can be done in high level languages such as C.

A particular type of neural network which is of interest is referred to as the backpropagation network. Such a network generally includes multiple layers of elements as described above. Adaptation of the network to a particular task is done by way of "training" the network with a number of examples, setting the weighting factors for each element to the proper value. This training is accomplished by presenting inputs to the network, analyzing the output of the network, and adjusting the weighting factors according to the difference between the actual output and the desired output for the training example. Upon sufficient training, the network is adapted to respond to new inputs (for which the answer is not known a priori), by generating an output which is similar to the result which a human expert would present for the same inputs. An example of a conventional backpropagation algorithm for training a neural network of this type is described in Rumelhart et al., *Parallel Distributed Processing* (The MIT Press, Cambridge, Mass., 1988), incorporated herein by this reference.

In such backpropagation neural networks, certain limitations exist which, in turn, limit the usefulness of neural networks in addressing the problem of first break identification. A first limitation is that the learning rates of conventional neural networks is quite slow. With the number of training cycles often numbering into the tens and hundreds of thousands for moderately complex problems, the usefulness of a neural network trained according to conventional methods and used in an interactive mode, such as is faced in the first break picking application described hereinabove, is quite limited.

Secondly, a serious problem for backpropagation neural networks is the possibility that the training may reach a state commonly referred to as a slow convergence region. A first example of a slow convergence region is trapping in a local minimum, where incremental change of the weighting factors in any direction increases the error, but where the network error is not at its lowest, or global, minimum. Another example of a slow convergence region is a region where the error gradient is exceedingly low (i.e., change in the weighting factors reduces the error only by an insignificant amount). Such local minimum trapping, low error gradient regions, and the like will be hereinafter referred to cumulatively as "slow convergence regions". Since conventional training methods rely on improvement of the result (i.e., reduction in an error term), one or more slow convergence regions may exist for a problem, in which the training of the network becomes slow, at best, or converges to an incorrect result.

Other inefficiencies also are present in conventional training methods which relate to the speed at which the set of weighting factors converge at the desired result, as will be described in further detail hereinbelow.

It is therefore a further object of this invention to provide a neural network which is adapted to perform recognition of first breaks in seismic traces.

It is a further object of this invention to provide a neural network which performs such recognition of first breaks using both information from the trace under analysis and also information from neighboring traces.

It is a further object of this invention to provide a method of training an adaptive or neural network in a more efficient manner.

It is a further object of this invention to provide a method of training an adaptive or neural network which is less susceptible to convergence problems in a slow convergence region, and which accordingly trains the network more efficiently.

It is a further object of this invention to provide a method of training a network which includes techniques for escaping from slow convergence regions.

Other objects and advantages of the invention will be apparent to those of ordinary skill in the art having reference to the following specification in combination with the drawings.

SUMMARY OF THE INVENTION

The invention may be incorporated into a computer system programmed to operate as a neural, or adaptive, network, and which includes stored seismic trace data. The network, once trained, is provided with the inputs of averaged graphical data corresponding to multiple seismic traces, each over a period of time. The network iterates in steps of time for the multiple traces, and indicates with one output that the first break is later than the time of interest, and with another output that the first break is at or prior to the time of interest. The time at which the outputs change state indicates the first break for the trace. The network may then operate on successive traces in the shot record, to further identify the first breaks in such traces in an automated manner. The adaptive network may be multiple layers, where links may be made from layer to layer which skip a hidden layer.

The invention may also be incorporated into a method for training an adaptive network for tasks such as first break picking. The training method includes an incremental training procedure where the trace with the greatest error from the desired result is used in backpropagation first, prior to the closer results. The method also includes detection of slow convergence regions, and adjustment of the network to escape such regions. The method further includes dynamic adjustment of the learning and momentum terms in the backpropagation step.

BRIEF DESCRIPTION OF THE DRAWINGS

FIG. 1 is a schematic diagram of a conventional 2-D seismic survey, illustrating a conventional arrangement of detectors relative to a surface seismic source.

FIG. 3 is a representational diagram of a conventional neural network.

FIG. 4 is a representational diagram of a neural network according to a preferred embodiment of the invention.

FIG. 5 is an illustration of a single trace in the shot record of FIG. 2, illustrating the location of the first break and the ideal operation of the network according to the invention.

FIG. 7a is a portion of a shot record including multiple traces over a short period of time near the first break point.

FIG. 7b is a digital discretization of the portion of the shot record of FIG. 7a.

DETAILED DESCRIPTION OF THE PREFERRED EMBODIMENT

Seismic Data Acquisition and Analysis

Figure 2:
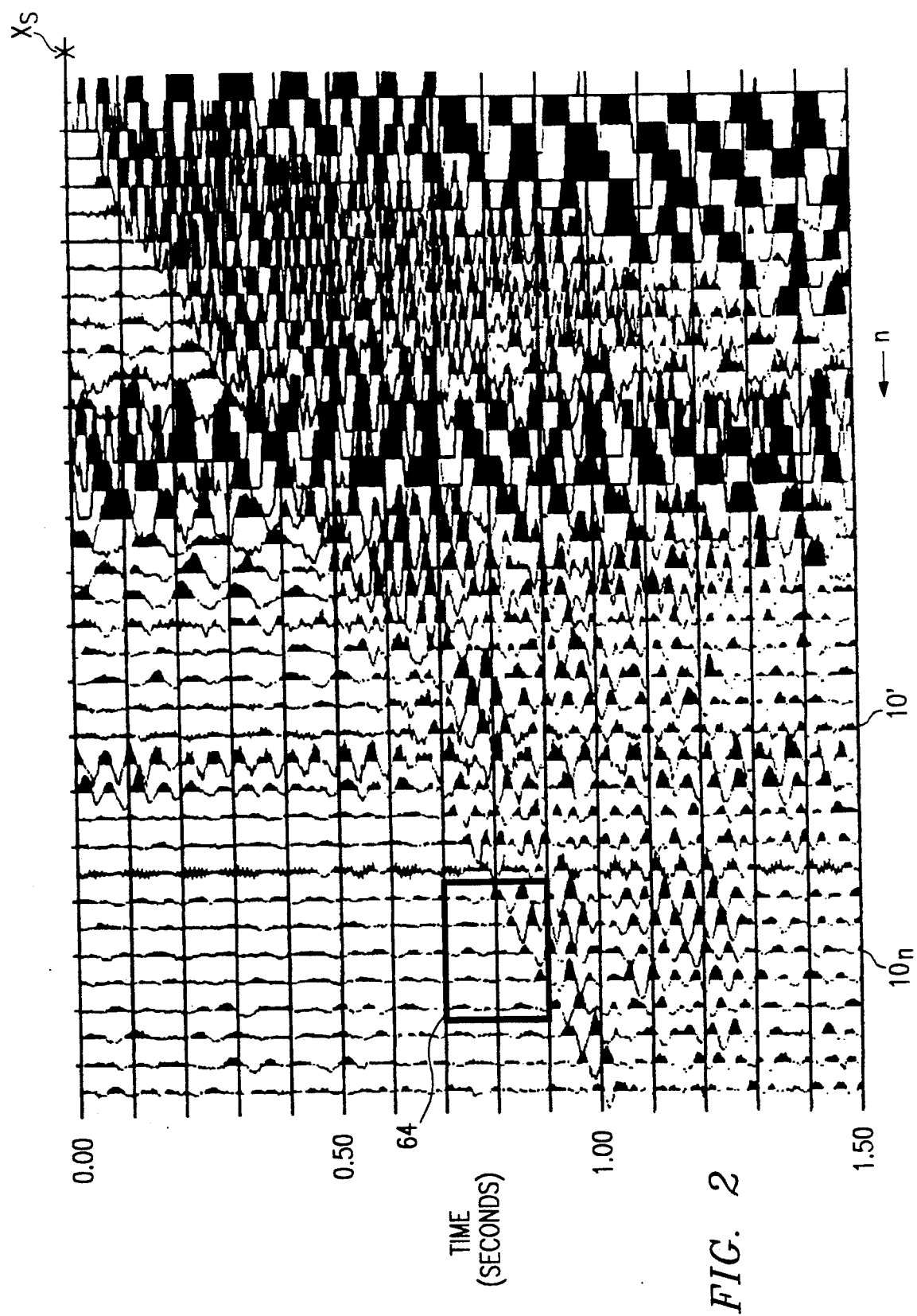
FIG. 2 is an example of a shot record according to a common source gather.

FIG. 1 schematically illustrates a conventional two-dimensional seismic survey arrangement, for the example of a land survey taken at the surface S. The location $X_s$ indicates the location of a seismic source, either a pulse source such as dynamite or a conventional "thumper", or an upsweep or downsweep wave generator such as is used in Vibroseis ® (Trademark of Continental Oil Company) surveying. A number of geophone groups P1 through P8 are shown in FIG. 1 as located along a line which includes the location $X_s$ of the source. As is well known in the art, a geophone group conventionally consists of a single geophone, or of multiple geophones near the same location whose electrical output signals are electronically summed together. Geophone groups P are generally evenly spaced from one another by a distance $X_d$, which is conventionally on the order of 100 feet. As is well known in the art of seismic exploration, geophone groups P will detect vibrations generated by the source at location $X_s$ and reflected from sub-surface strata. The detected vibrations are stored and displayed for each geophone group P, with the time domain display of the detected vibrations from a single geophone group P commonly referred to as a seismic trace. It should be noted that while only eight geophone groups P are shown in FIG. 1, conventional two-dimensional seismic surveying may use from ninety-six to one thousand geophone groups P in the line. The set of traces received responsive to source vibrations from a single source location is generally referred to as a shot record.

After the source has provided vibrations from location $X_s$, and after geophone groups P have detected the vibrations and stored a representation of the same (generally by transmitting signals to a recording station located in the field), the location of the source is moved, generally by the distance $X_d$ to between the next two geophone groups P. Referring to FIG. 1, the next location of the source would be between geophone groups P5 and P6. Geophone group P1 will be moved to the other end of the line, for example to a location which is a distance $X_d$ on the other side of geophone group P8 from geophone group P7. Another shot record is taken with the source at this new location. The set of shot records taken by the iterative moving of the source is commonly referred to as the seismic line, or seismic survey. By conventional data processing, such as common depth point (CDP) or common midpoint (CMP) stacking, information about the underlying geological formations can be determined from the resulting seismic line or survey. The data from the seismic survey is generally stored, and may be reanalyzed at a later time.

Especially in land surveys, the near-surface layer, also referred to as the weathered layer, presents a layer of relatively low velocity to seismic vibrations. The thickness of the weathered layer frequently varies over the surface of the earth, causing the time delays of vibrations as they travel therethrough to vary according to the surface location. Failure to take such variations into account will reduce the quality of the survey, as sudden changes in the velocity will cause the traces to not line up after move-out correction; gradual near-surface velocity changes may even produce a false sub-surface structure. However, correction for this layer may be done using a velocity model, generated for the near-surface weathered layer from the measurement of refracted vibrations detected by the geophone groups P. The refracted vibrations will generally arrive at the geophone groups P from the source location $X_s$ at a time earlier than the reflected vibrations, since the distance of travel is much shorter. Since the distance between the source location $X_s$ and each geophone group P is known for a given shot record, the velocity model may be determined by identifying the time at which the first vibrations are detected by each geophone group P. On seismic traces, this time is generally referred to as the "first break".

FIG. 2 is a typical seismic shot record of traces 10 from a number of geophone groups P, arranged in the conventional manner with the time axis vertical, and with the distance axis horizontal. In the example of FIG. 2, the source location $X_s$ is at the top right of the record. As is evident from FIG. 2, the greater the distance from the source location $X_s$ to the geophone group P for a particular trace, the later that vibrations are detected at the geophone group. The point at which each trace 10 changes from a relatively flat record to a non-zero amplitude corresponds to the first break.

In order to perform the static correction discussed above, the first break locations must be determined for each of the traces 10 in the shot record of FIG. 2. This is conventionally done manually, by a technician reading the shot record of FIG. 2 and marking the times at which the first breaks occur for each trace 10. As is evident even from the relatively small shot record of FIG. 2, this can be quite time consuming and labor-intensive. Furthermore, as is evident from some of the traces (see, e.g., trace 10'), some amount of judgment in picking the first break is required, as the traces are not all identical to one another due to noise, and due to the actual travel time of the refracted vibrations.

Neural Network Architecture

A class of computing techniques commonly referred to as adaptive, or neural, networks have been used, as noted hereinabove, for the solution of certain types of problems. These neural networks are commonly implemented by computer programs operating on conventional computing equipment; it should be noted, however, that special dedicated hardware for the implementation of neural networks has been constructed. As will be described hereinbelow, the preferred embodiment of this invention utilizes a neural network technique for the automation of the first break picking process, and provides significant labor savings over the manual operation.

Referring now to FIG. 3, a conventional backpropagation neural network 40 is schematically illustrated. As noted above, neural network 40 is generally implemented in a computer program on conventional computer hardware, for example a DEC Workstation 3100 or other similar computer, programmed in a high level language such as FORTRAN. Such programming, using high level languages, of conventional computer systems to operate as an artificial neural network is well known in the art, as described, for example, in Y. H. Pao, *Adaptive Pattern Recognition and Neural Networks*, cited hereinabove and incorporated herein by reference. Accordingly, for such a software implementation, the network 40 of FIG. 3 is a representation of the operation of the computer program; such representation for computer programs of this type is conventional and well-known in the art.

Network 40 includes three layers of nodes 42, 44 and 46, arranged in layers. The layer of nodes 42, each receiving an input to network 40, is referred to as the input layer; conversely, the layer of nodes 46, presenting outputs from network 40, is referred to as the output layer. The layer of nodes 44, each of which receives inputs from input nodes 42, and presents an output to output nodes 46, is commonly referred to as a middle, or hidden, layer. While a single hidden layer is illustrated in FIG. 3, it should be noted that conventional networks may include multiple hidden layers between the layer of input nodes 42 and the layer of output nodes 46.

Conventional problems solved by network 40 include the classification of an input into one of several classes; generally output nodes 46 each are associated with a class, so that a single one of output nodes 46 will, for each set of inputs to network 40, indicate that the input set belongs to its corresponding class. The problem of first break picking described hereinabove is an example of such a classification problem. It should be noted that simple neural networks may be constructed (or programmed, as the case may be) without a hidden layer of nodes 44, or even with a single layer of nodes 42, depending on the simplicity of the classification or other type of problem to be solved. The provision of a hidden layer of nodes 44 such as network 40 of FIG. 3 allows for the solution of a classification problem, for example, having arbitrary and complex boundaries of decision regions within the space spanned by the inputs.

In conventional networks, the response $\Omega_i$ of a node i receiving j inputs, the jth input to node i represented by the value $I_{ij}$, is according to the following sigmoidal function:

$$\Omega_i = 1 / \left[ 1 + \exp\left[ \left( -\gamma \sum_j W_{ij} * I_{ij} \right) + T_0 \right] \right]$$

where $W_{ij}$ is the weighting factor for the jth input to the node i. The constant $\gamma$ is a gain constant greater than zero, and the constant $T_0$ is a threshold value for the sigmoidal function.

In order for a network 40 to solve a problem such as a classification problem, the weighting factors $W_{ij}$ for the nodes must first be set to proper values according to the problem to be solved. This training procedure for networks 40 is done by presenting inputs with known desired results to the network. The output of the network is compared against the desired result, and an operation which backpropagates error information from the output nodes 46 toward the input nodes 42 is used to correct the weighting factors $W_{ij}$ according to this error information. The change in the weighting factors effectively allows each of the nodes 42, 44, 46 to ignore (relatively) the inputs from certain of the nodes providing it inputs, and to follow others of the inputs. The backpropagation is done according to the well-known generalized delta rule, which may be expressed for network 40 operating according to the above equation for $\Omega_i$ as follows:

$$W_{ij}(t+1) = W_{ij}(t) + \beta \epsilon_i I_{ij} + \mu [W_{ij}(t) - W_{ij}(t-1)]$$

where $\beta$ is a learning constant normally in the range from 0.0 to 1.0, and where $\mu$ is a momentum constant also normally in the range from 0.0 to 1.0. The value $\epsilon_i$ is an error term defined, for an output node 46, by:

$$\epsilon_i = \epsilon_i (1 - \Omega_i)(D_i - \Omega_i)$$

where $D_i$ is the desired output for the input presented. The error term $\epsilon_i$ for a hidden node 44 is defined by:

$$\epsilon_i = \Omega_i (1 - \Omega_i) \Sigma \epsilon_k \Omega_k;$$

k being all nodes in the layers above the hidden node 44

The application of the generalized delta rule to adjust the weighting factors $W_{ij}$ in network 40 is an iterative process, both iterative toward converging the error to within a certain tolerable limit for a given input example, and iterative for multiple examples. As indicated above, this iterative process may require tens of thousands or hundreds of thousands of iterations for a moderately complex problem.

Referring now to FIG. 4, a neural network 50 according to a preferred embodiment of the invention is representationally illustrated. As in the prior case, network 50 may be implemented in a computer program in conventional computing equipment or, as depends upon the network needs relative to the available technology, may be implemented in dedicated neural network hardware.

Network 50 of FIG. 4 includes input nodes 42, hidden layer nodes 44, and output nodes 46, as in the conventional network 40 of FIG. 3. Besides the links from input nodes 42 to hidden layer nodes 44, and the links from hidden layer nodes 44 to output nodes 46, as present in network 40 of FIG. 3, network 50 includes links 48 which directly connect input nodes 42 to output nodes 46. In FIG. 4, examples of such links 48 include link $48_{00}$ from input node $42_0$ to output node $46_0$, link $48_{21}$ from input node $42_2$ to output node $46_1$ and link $48_{n1}$ from input node $42_n$ to output node $46_1$. While it is illustrated that not all input nodes 42 may have links 48 to either or both of output nodes 46, it is of course contemplated that such full connection of links 48 may be utilized.

The network 50 of FIG. 4 provides significant advantages over the prior network arrangement 40 of FIG. 3. Firstly, provision of such links 48 allows for more rapid convergence during training of the network 50, since a higher degree of connectivity is provided within network 50. For example, if an output node 46 is strongly dependent upon one particular input node 42, a direct link 48 therebetween allows more rapid convergence to the proper weighting according to this dependence, rather than going through a "filter" of the hidden layer of nodes 44 to arrive at the proper result. This improved training convergence is especially apparent considering that the conventional network 40 has only a limited set of weighting factors $W_{ij}$ which provide an accurate solution. Provision of links 48 as in network 50 enlarges the potential number of sets of weighting factors $W_{ij}$ which provide an acceptable solution, and thus allows more rapid convergence to an acceptable set.

In addition, during the training procedure, constraints may be inserted which allow for the network 50 to consider such factors as minimization of the number of total links, not merely links 48. Reduction of the number of links in network 50, which is enabled by providing links 48 which skip the hidden layer of nodes 44 for some nodes, will not only reduce the training time of the network 50, but will also optimize the performance of network 50 for its application, for example the recognition problem of first break picking.

The training of network 50 to include links 48 will be described in further detail hereinbelow.

Adaptive Network Operation for First Break Picking

The application and operation of network 50 in performing first break picking will now be described. For purposes of this discussion, network 50 will be presumed to have been trained, so that the weighting factors $W_{ij}$, and the presence or absence of links 48, will have been set prior to the discussion of this method. The preferred training method will be described in detail hereinbelow. It should also be noted that the method of first break picking may be performed by conventional networks such as network 40 of FIG. 3, without links 48. Indeed, it is contemplated that many first break picking tasks may be performed by simple two-layer networks; for example, successful operation of a two-layer network having on the order of 4000 input nodes 42 and two output nodes 46 has been observed in the first break picking application.

Referring back to FIG. 4, network 50 includes two output nodes $46_0$ and $46_1$. As is conventional in the classification problem solvable by adaptive or neural networks of the backpropagation class, the number of classes into which the network is to classify the input corresponds to the number of output nodes 46, with one and only one of the output nodes presenting a positive output indicative that the network identifies the input set as a member of the class associated with that output node 46. In FIG. 4, the output from output node 46 is indicated by line OUT0, and the output from output node $46_1$ is indicated by line OUT1.

Referring again to FIG. 2, traces 10 from a seismic shot record are illustrated. According to this embodiment of the invention, analysis of traces 10 by network 50 is done for individual traces 10, by considering information in the time series of the individual trace 10 together with the information from neighboring traces 10, in an iterative manner relative to time, proceeding from t=0 to the point in time at which the first break is detected. Accordingly, in this embodiment, output OUT0 corresponds to network 50 determining that the first break is at the time under consideration or earlier, and output OUT1 corresponds to network 50 determining that the first break is later than the time under consideration.

Referring now to FIG. 5, an individual trace 10 is illustrated as a function of time for purposes of illustrating the arrangement of output nodes 46 in network 50 for performing first break analysis according to this embodiment of the invention. As is conventional in the art, trace 10 is displayed by using a filled region to indicate positive amplitude. The true first break is identified on FIG. 5, at time $t_{fb}$. The response of an ideally trained network 50 is also illustrated as a function of time, where for $t < t_{fb}$, output node $46_1$ is issuing a "1" on line OUT1, indicating that the first break time is later than the associated time t. As t becomes equal to or greater than the first break time $t_{fb}$, line OUT1 from node $46_1$ is at a "0" state, and output node $46_0$ issues a "1" on line OUT0. The value of time at which the outputs OUT0 and OUT1 of network 50 change state, in this embodiment, indicates the first break time determined by network 50.

The determination of the first break time for a given trace 10 is performed, in this embodiment, via analysis not only of the individual trace 10, but also its neighboring traces. This has been found to be preferred over single trace analysis, based upon the realization that the similarity of signal waveforms from trace to trace assists a human analyst in finding the first break for a given trace. Comparing FIG. 5 to FIG. 2, for example, it is apparent that it is easier to identify first breaks from the shot record of FIG. 2 than from an individual trace 10 as shown in FIG. 5.

Figure 6:
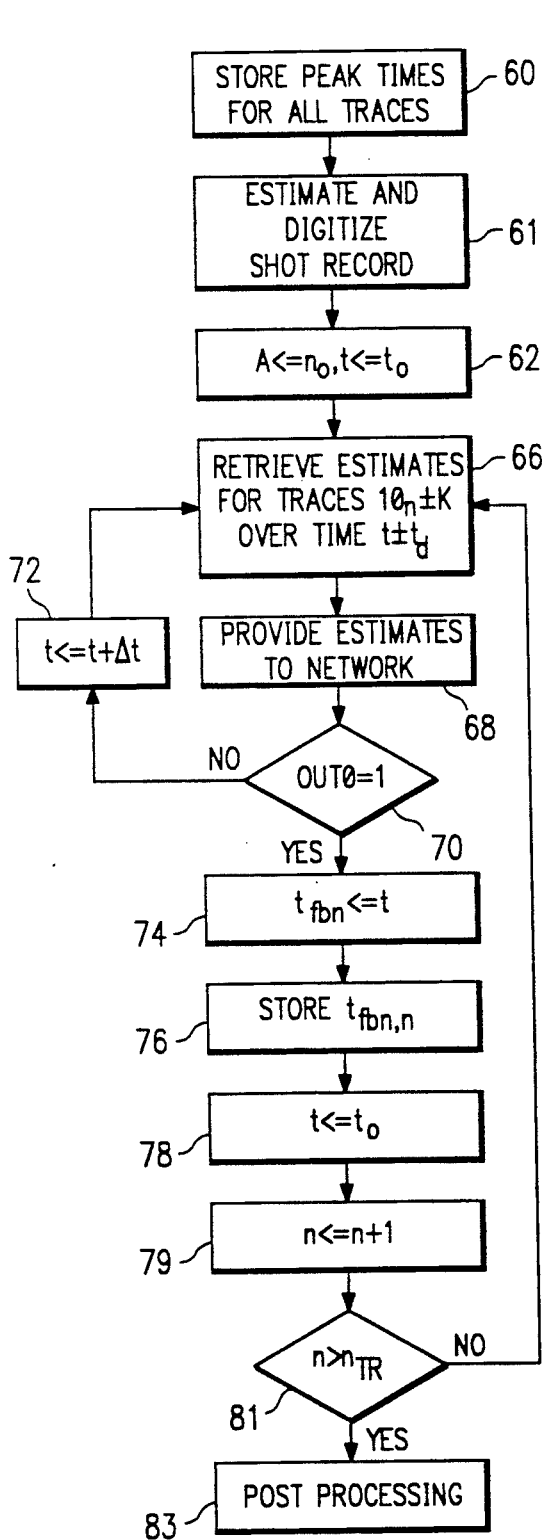
FIG. 6 is a flow diagram of a method of first break picking using an adaptive network according to the preferred embodiment of the invention.

FIG. 6 illustrates a flow for a method of first break identification by an adaptive network according to this embodiment of the invention. This method begins with process 60, in which the times of positive peaks of the signal amplitude for each trace are stored in memory. Since the first break time is conventionally defined as the time of the peak corresponding to the refracted signal, it is preferred in this method to store the peak times, as these times will be the times of interest in performing the first break identification. It should be noted that the times of zero crossings, or troughs (peaks of negative amplitude) may alternatively be stored in memory in process 60.

According to this embodiment of the invention, the information which is presented to the adaptive network for first break identification is graphics data corresponding to the shot record as it would be viewed by a human operator at a display terminal. As is well known, displays for conventional computer systems are generally bit-mapped displays, where a portion of computer memory stores, in digital form, the data to be displayed on a computer screen (or sent to a plotter) in a position-by-position representation. Conventional video displays are organized by picture elements, or pixels; in a monochrome display system, for example, the bit-mapped memory will store a "1" state for each pixel that is to be bright, and a "0" state for each pixel that is to be dark. In such an arrangement, the video display is generated by reading the bit-mapped memory, line by line, and energizing or not energizing each pixel according to the data state stored in memory at the corresponding location.

The number of pixels required for the display of a shot record such as FIG. 2 is quite large, especially considering the resolution of the individual traces. For a display size on the order of 1024 by 1024 pixels, as is conventional for high-resolution workstation displays, the assignment of one input node 42 in the adaptive network for each pixel would thus require over one million input nodes. Such an adaptive network would require extremely long computing times, using current technology, especially if the network included one or more hidden layers, increasing the number of weighting factors. Of course, training such a massive network, for example using backpropagation, would similarly be quite slow.

It has been found that good results may be obtained in identifying first breaks, without requiring an input node 42 for each pixel of the display. It has been observed that effective first break detection, and other processing, may be achieved by an adaptive network such as network 50, and indeed simpler networks such as a two-layer network, with far fewer nodes (e.g., on the order of 4000 input nodes). Accordingly, since it is not necessary to have individual pixel resolution in order to adequately solve the first break identification problem, and since the network size would be unmanageably large with such resolution, the method according to this embodiment of the invention uses a graphical estimate of the shot record in identifying first breaks for each trace. Referring to FIG. 6, process 61 in the method performs such estimation, as will now be described in detail relative to FIGS. 7a and 7b.

Figures 7A, 7B:
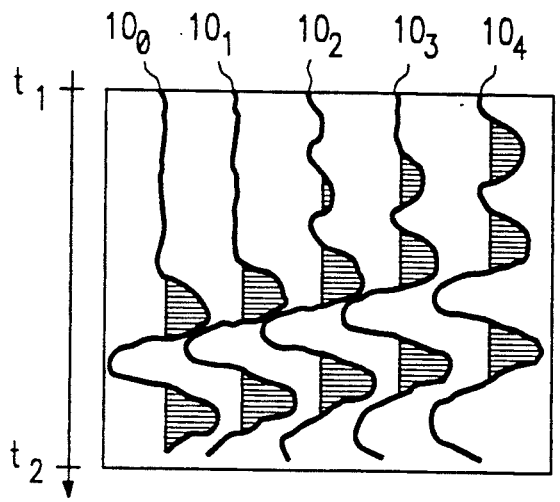

FIG. 7a illustrates a portion of the shot record of FIG. 2, the digital and graphical estimation of which, by the preferred method of process 61, will be described by way of example. The portion of FIG. 7 includes five traces 10 through $10_4$, from time $t_1$ to $t_2$. The shot record of FIG. 7a is taken around a first break point, for purposes of explanation; the estimation method does not, of course, depend on the particular time period being at a first break. As is conventional for the display of traces 10 in a shot record, positive amplitudes are filled in, so that a zero amplitude line need not be displayed or plotted, reducing the confusion of the shot record.

A first step in performing the estimate is the normalization and discretization of the amplitude of the traces 10. First, the amplitude of each trace is normalized, setting the maximum amplitude over the entire shot record equal to 1.00. After normalization, each peak is discretized, and a three bit digital value assigned, as follows:

−1.000 to 0.249:000
0.250 to 0.499:100
0.500 to 0.749:110
0.750 to 1.000:111

The particular three bit value is selected so as to represent, with less resolution, each seismic trace 10 in a manner in which only positive amplitude peaks are displayed, and where the zero amplitude line is at the left hand side of the discretized estimate.

Figure 10:
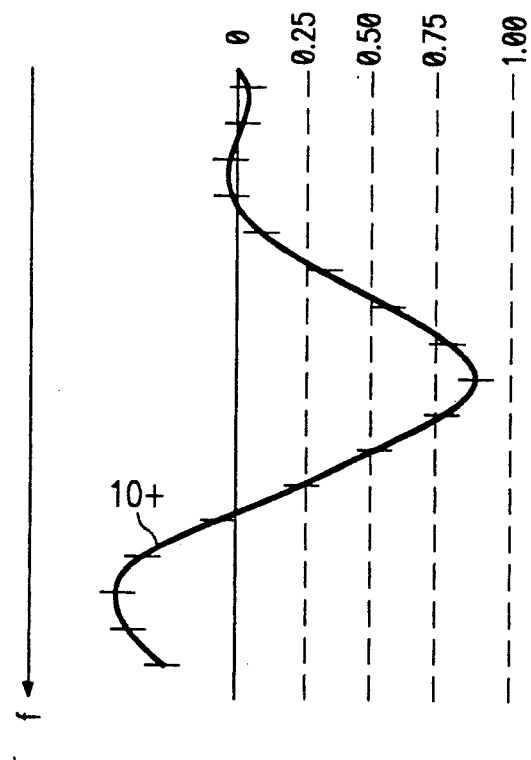
FIG. 10 is a comparison of a seismic trace to a digital discretization thereof according to the preferred embodiment of the invention.

Referring to FIG. 10, a seismic trace $10_x$, and how it corresponds to the digital discretized estimate, is illustrated. In FIG. 10, the seismic trace $10_x$ is based upon sampled amplitudes of the vibrations detected by geophone groups P over time. A preferred sampling period for this embodiment is on the order of 2 to 4 msec. As is well known in the art, sampling may be used in the vibration detection at geophone groups P, or analog signals may be generated by geophone groups P which are subsequently sampled and stored in memory in a manner corresponding to the sample time. For seismic trace $10_x$ of FIG. 10, the samples are ordered from an arbitrary sample number 1 through 17.

Based on the normalization and discretization described above, each of the amplitudes of the sampled vibrations is assigned a digital number. For example, since the amplitude of samples 1 through 6 is below 0.25 (on the normalized scale), the digital discretization stores the value 000 for each of these samples. For the time of sample 7, where the trace $10_x$ has an amplitude between 0.25 and 0.50, the digital representation stored will be 100; sample 8, with an amplitude between 0.50 and 0.75, corresponds to the digital discretization of 110. Samples 9 and 10 are in the highest quantum, and accordingly have a corresponding digital discretization of 111. Samples 11 through 17 are similarly discretized, with the negative amplitudes of samples 14 through 17 assigned the digital value 000.

A comparison of the digital discretization of FIG. 10 to the seismic trace $10_x$ shows the resemblance between the digital discretization and the seismic trace $10_x$, if it were represented with positive amplitudes filled as in the case of FIG. 7a for traces $10_0$ through $10_4$.

Referring to FIG. 7b, a digital discretized estimate of traces $10_0$ through $10_4$ from time $t_1$ to $t_2$, generated as described hereinabove, is illustrated. FIG. 7b is divided into five portions, each of which is three bits wide, to illustrate the correspondence between the seismic traces $10_0$ through $10_4$ of FIG. 7a and their digital discretization in FIG. 7b. Each of the three-bit digital discretizations of FIG. 7b corresponds, as shown in FIG. 10, to the amplitude of its associated trace at a sampling time. As is apparent from FIG. 7b, the digital discretization for each of the traces $10_0$ through $10_4$ is indicative of the positive (i.e., filled-in) amplitude for each trace, and of the time relationship among the traces.

The digital discretization illustrated in FIG. 7b is a coarser representation of the traces 10 through $10_4$ than is the representation of FIG. 7a. The representation of FIG. 7a could be displayed on conventional graphic displays for workstations with quite fine resolution, appearing similar to that of FIG. 7a. However, if the bit-mapped display information representative of the portion of the shot record of FIG. 7a were to be directly applied to the adaptive network, the number of input nodes 42 in such a network would be unmanageably large. For example, if the portion of the shot record of FIG. 7a were displayed by an array of 256 pixels by 256 pixels, 65,536 input nodes 42 (with the corresponding number of connections) would be necessary to receive each pixel input in an adaptive network.

It has been found that adequate results for first break picking may be obtained with many fewer input nodes 42. The digital discretization according to the above-described method reduces the number of input nodes 42 required for the adaptive network to perform the first break picking operation. In the example of FIG. 7b, only 150 input nodes 42 would be necessary to receive the information according to the shot record of FIG. 7a. Accordingly, as a result of process 61 in the method of FIG. 6 according to this embodiment of the invention, the number of input nodes 42 are much reduced from the number of pixels required to display a corresponding portion of the shot record. In this way, the graphical representation of the shot record, such as shown in FIG. 2, is preferably reduced to a fewer number of bits, so that the size of the adaptive network operating on the shot record may be maintained at a manageable size while still providing for high accuracy. As a result of process 61, an averaged digital representation of the shot record is thus produced, and stored in computer memory.

Referring again to the flow diagram of FIG. 6, after the estimation of the shot record from process 61, the initial point at which the network analysis of a trace is to begin is initialized in the network operating program, at process 62. In process 62, the trace $10_n$ of interest for analysis is selected, and a time of interest $t_0$ is selected. As described above, since the first break time occurs, by definition, at a peak of the trace, time $t_0$ preferably corresponds to a peak time of the trace $10_n$; this peak time $t_0$ is retrieved from the data stored in memory in process 60 described hereinabove. Alternatively, as noted hereinabove, other points on the trace waveform may be selected for time $t_0$, including the time of a trough (negative amplitude peak) or a zero crossing.

The trace $10_n$ may be any one of the traces of the shot record; for the analysis of the entire shot record of FIG. 2, for example, the traces 10 will be analyzed sequentially beginning from trace $10_{n0}$, set in process 62, with the order of analysis unimportant. The time of interest $t_0$ is preferably a time which is at a point earlier than the first break time $t_{fb}$. Such selection of the time $t_0$ allows the network to identify the first break time $t_{fbn}$ for trace $10_n$, by detecting the time t at which the state of the outputs OUT0 and OUT1 change.

After initialization of the analysis, process 66 is performed, in which the discretized data from process 61 are retrieved from memory; such data corresponds to k traces on either side of the trace of interest $10_n$, and the sampled data therefor within a time $t_d$ on either side of the time of interest t. The sampling period for the data is generally on the order of 2 to 4 msec between samples. For example, with k=2 and $t_d$=0.1 seconds, retrieval of the discretized data for trace of interest $10_n$ at time of interest t of 0.80 seconds, would retrieve the data corresponding to box 64 of FIG. 2, digitally discretized for each sample therewithin as described hereinabove relative to FIGS. 7 and 10. In process 68 of FIG. 6, the discretized data is presented to input nodes 42 of the network 50, with each bit of the discretized data received by an input node 42.

Responsive to the presentation of the discretized data from the portion of the shot record of interest to network 50 (network 50 being previously trained, preferably according to the training methods described hereinbelow), network 50 will present an output at its output nodes 46, with line OUT1 in this embodiment indicating, with a "1" state, that the time of interest t is before the first break time $t_{fb}$, and a "1" state at line OUT0 indicating that the time of interest t is at or after the first break time $t_{fb}$. In decision process 70, the state of the outputs of network 50 are interrogated.

As is well known for neural networks, the actual values presented by outputs OUT0 and OUT1 will generally not match the idealized values of 1 and 0, but will instead be a fractional value between 0.000 and 1.000 at each of the outputs. This is due to the nature of the data presented to the network, and also due to the training of the network stopping at a point where the error presented by the network is within a tolerable level. Accordingly, the first break time is preferably identified by the network presenting an output which meets a certain criteria. An example of a simple criteria for first break picking is to identify a first break as the sample time at which the value presented by output node $46_1$ (OUT1) is greater than the value presented by output node $46_0$ (OUT0). Alternatively, a tolerance limit may be used as the first break criteria. For example, the first break time may be defined as the time at which OUT1 is 0.800 or greater and at which OUT0 is 0.200 or less.

If outputs OUT0 and OUT1 indicate that the time of interest t is prior to the first break time $t_{fb}$, the method according to this embodiment of the invention will analyze the shot record for the same trace of interest $10_n$ at another, later, point in time. Accordingly, in process 72, the time of interest t is incremented by an incremental amount $\Delta t$. The incremental time $\Delta d$ preferably corresponds to the time from time t to the next peak time of the trace of interest $10_n$, with the time of the next peak stored in memory by process 60. Upon incrementing the time of interest t, in process 66 the discretized sampled data is retrieved for traces $10_n$ plus k neighboring traces 10 on either side thereof, over the period of time $t-t_d$ to $t+t_d$, and presented to network 50 in process 68. Network 50 again processes the digital estimate data presented to its input nodes 42 in the same manner, and the output nodes 46 are again interrogated in process 70.

According to this embodiment of the method, process 74 sets the first break time $t_{fbn}$ for trace $10_n$ with the point in time t at which the output nodes of network 50 indicate, according to the defined criteria, the first break time. In process 76, the value of $t_{fbn}$ is stored in memory, in a manner associated with trace $10_n$. The method according to this embodiment of the invention then proceeds with analysis of the traces in the remainder of the shot record, by resetting the time of interest to t (process 78), and incrementing the value of n to analyze the next trace 10 of the shot record (process 79). Process 81 tests the value of n to determine if it exceeds the number of the last trace to be analyzed (i.e., $n_{tr}$). If the incremented value of n does not exceed $n_{tr}$, more traces 10 remain to be analyzed, beginning again with retrieval of the discretized data for the new traces, centered at the initial time of interest $t_0$, with the process continuing from this point as described hereinabove.

Post-Processing

If all of the traces 10 to be analyzed have been analyzed, i.e., $n > n_{tr}$ in process 81, according to this preferred method of the invention certain post-processing of the results is performed in process 83. The data which is preferably post-processed is that of the stored first break times $t_{fbn}$ for each trace $10_n$ analyzed by the above method. This post-processing is intended to correct those first break times calculated by the adaptive network and which are clearly in error. For example, if a first break time is calculated by the adaptive network to occur at a time prior to the first break calculated for a position closer to the source, one of the two calculated first breaks must necessarily be in error. In addition, other factors besides the calculated first break time may be considered, including a measure of the size of the error at the output of the adaptive network at the calculated first break time, and including such effects as common offset grouping. As will be described in further detail hereinbelow, the post-processing is performed according to two sequential grouping operations.

Figure 11:
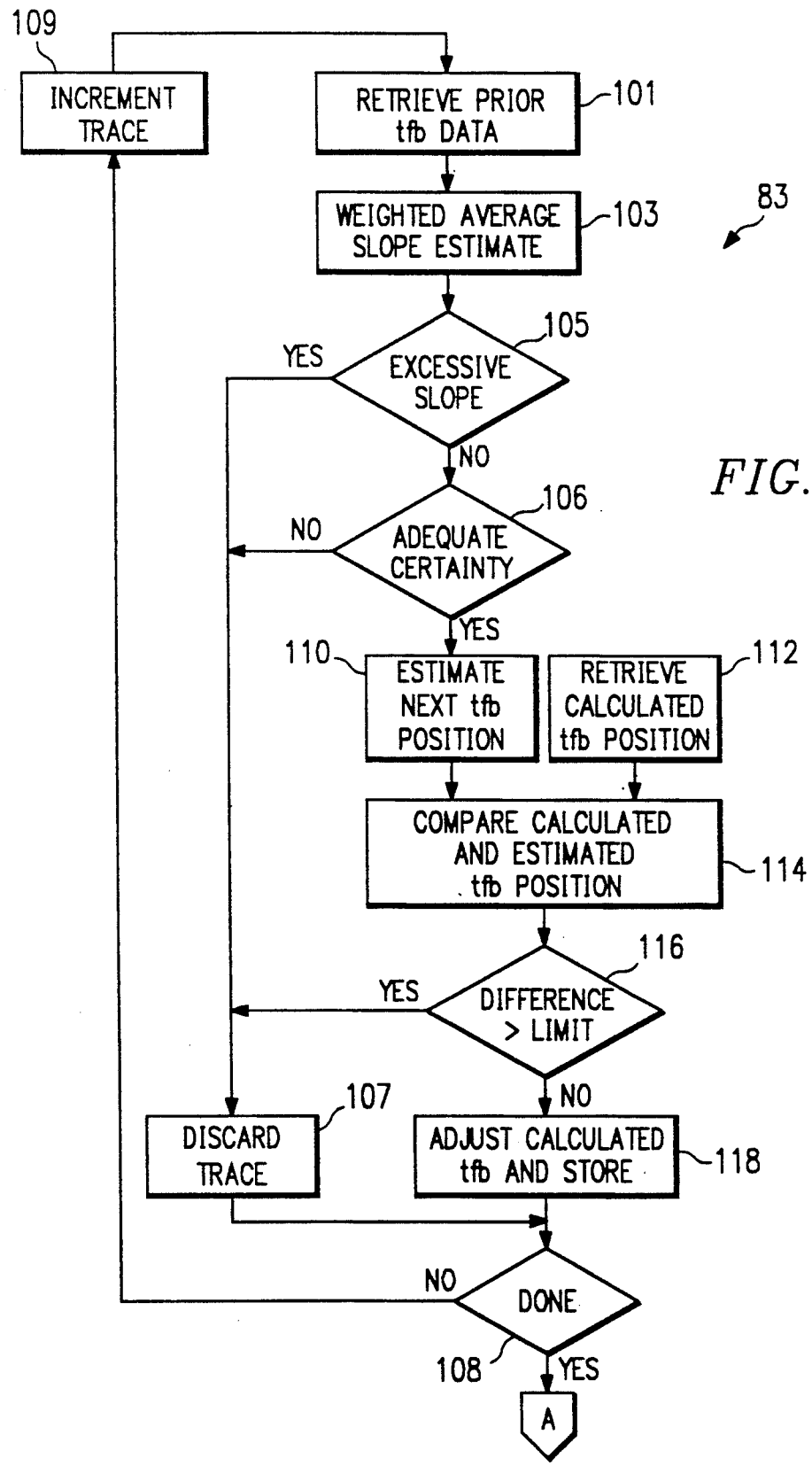
FIGS. 11 and 12 are flow diagrams of a post-processing method of the first break times determined according to the preferred embodiment of the invention.

The first grouping is a four trace estimation and optimization operation. Referring now to FIG. 11, a preferred example of the first grouping operation in the post-processing of process 83 will now be described. This method estimates the first break time for the next trace, based on the results of the prior two traces, and compares the estimated first break time to the actual first break time determined by the adaptive network according to the method described above relative to FIG. 6. If the calculated actual first break time differs too far from the estimate, or if the error of the network exceeds a certainty limit, a seismic discontinuity can be presumed, and the first break time from the trace will be discarded from further use in estimating the next first break time. If the difference is within a certain range, the post-processing process 83 provides correction of the calculated first break time based on neighboring first break times.

The example begins with process 101, in which the first break times $t_{fb}$ for two traces previously calculated (and preferably adjusted according to this method) are retrieved. As mentioned above, the amplitudes of the vibrations are preferably sampled, and the sampled data stored and used in the process described hereinabove. For purposes of explanation herein, the variable of time will be expressed relative to sample points; the trace of interest in this method will be referred to as trace $T_{i+1}$. As noted hereinabove, the sample times may be on the order of 2 to 4 msec apart.

Process 101 thus retrieves the sample points corresponding to the first break time $t_{fb}$ for two prior traces, such sample points referred to as pickpoints $P_i$ and $P_{i-1}$. Process 101 also retrieves, in this embodiment, the value of the slope of the first break times, corresponding to the difference in pickpoint time from trace to trace, evaluated at the prior trace $T_{i-1}$, such a slope referred to as $M_{i-1}$. Process 103 uses the retrieved information to estimate the slope $M_i$ of the first break times at the immediately prior trace $T_i$, calculated according to the following weighted average:

$$M_i = \tfrac{1}{3}[(P_i - P_{i-1})/(i-(i-1))] + \tfrac{2}{3}(M_{i-1})$$

where the value i corresponds to the trace number of the closest previous valid trace, and where the value $i-1$ corresponds to the trace number of the next closest previous valid trace (the difference therebetween corresponding to the distance between geophone groups which detect valid first breaks). This slope $M_i$ is thus an estimate of the rate of change of the pickpoint time between traces, evaluated for the trace i.

Test 105 evaluates this estimated slope to determine if it lies within a reasonable limit; the limit can be previously established based on the known characteristics about the source and the near-surface layer. Test 108 evaluates the certainty factor to determine if the estimate of the slope is so uncertain that use of the estimated slope $M_i$ would not provide a useful pickpoint estimate. The certainty factor for a particular pickpoint depends upon the amount of error in the output of the adaptive network at the calculated first break point (i.e., difference between the value of the outputs OUT0 and OUT1 and the values 1.00 and 0.00, respectively). Such a certainty factor is preferably determined by normalizing the error to within a range from the maximum amount tolerable to zero, and is preferably in inverse proportion to this error (i.e., the less the error, the more certain the result).

If the slope $M_i$ is outside of the desired range (test 105) or if the average value of the certainty is less than a particular value (test 106), the trace is discarded from further use in estimation (process 107), and the post-processing method begins with the next trace in the sequence (incrementing of the trace number performed in process 109), unless test 108 determines that the present trace $T_{i+1}$ is the last trace to be analyzed. If the slope $M_i$ is within the proper range, and is based on pickpoints of reasonable certainty, the post-processing continues with process 110.

Process 110 extrapolates, based on the pickpoint $P_i$ and the slope $M_i$, an estimated sample position for the next first break time $t_{fb}$, i.e., an estimated pickpoint $P_{i+1(e)}$. The extrapolation is preferably a linear extrapolation. In process 112, the first break time $t_{fb}$ is retrieved, in the form of a pickpoint $P_{i+1(c)}$. Process 114 compares the estimated pickpoint $P_{i+1(e)}$ with the calculated pickpoint $P_{i+1(c)}$, and determines the number of sample points therebetween (which, of course, corresponds to the time difference between the estimated first break time and the first break time determined by the adaptive network). In process 116, the difference is compared against a limit. If the difference exceeds a tolerance limit, the trace of interest $T_{i+1}$ will be discarded from future estimation in process 107, and the next trace will be analyzed. If the difference is less than the limit, an adjustment of the calculated first break time may then be performed, in process 118.

Process 118 adjusts the calculated first break time (retrieved in process 112) according to potential seismic discontinuities for the position corresponding to the trace of interest $T_{i+1}$, and according to another certainty factor. A ratio is first calculated, using the preceding two pickpoints $P_i$ and $P_{i-1}$, the estimated pickpoint of interest $P_{i+1(e)}$ for trace of interest $T_{i+1}$, and the calculated pickpoints $P_{i+2(c)}$ and $P_{i+3(c)}$ for the next two neighboring traces $T_{i+2}$ and $T_{i+3}$, such pickpoints stored in memory by the process of FIG. 6. This ratio is calculated as follows:

$$\text{ratio} = [((P_{i+2(c)} + P_{i+3(c)})/2) - P_{i+1(c)})/2]/\text{abs}[-P_{i+1(c)} - P_{i+1(e)} + 0.1]$$

A confidence weighting factor $C_{next}$ for the traces $T_{i+1}$ and $T_{i+2}$ is then calculated:

$$C_{next} = 1; \text{ or}$$

$$C_{next} = 0.8/[0.5*(1+(i+3)-(i+2))*\text{ratio}] \text{ or}$$

$$C_{next} = (C_{i-3} + C_{i-2})/[(1+(i+3)-(i+1))*\text{ratio}]$$

whichever is less. It should be noted that the subtraction indicated hereinabove of the values (i+3), (i+2), and (i+1) is the subtraction of the numbers assigned to the valid traces; because traces may be discarded according to this method, the actual trace numbers will not necessarily differ by 1 (e.g., (i+3)−(i+2) will not equal 1 if a trace between traces $T_{i+3}$ and $T_{i+2}$ has been discarded). A confidence factor $C_{est}$ for the estimated pickpoint $P_{i+1(e)}$ is also calculated, according to:

$$C_{est} = 1; \text{ or}$$

$$C_{est} = \text{ratio}*[(C_{i-2} + C_{i-1})/(1+i-(i-2))]$$

whichever is less, where $C_i$ is calculated as described hereinbelow. The adjusted pickpoint $P_{i+1}$ is then calculated as the nearest trace peak to the point defined by:

$$[C_{next}*((P_{i+2(c)} + P_{i+3(c)})/2 + (C_{est}*P_{i+1(e)})]/(C_{next} + C_{est})$$

and the certainty factor $C_{i+1}$ of this estimate for pickpoint $P_{i+1}$ (the certainty factor $C_i$ is preferably initialized for all traces to the value 0.8) is adjusted to the lesser of the value 1 or:

where the difference between $P_{i+1(c)}$ and $P_{i+1}$ is less than two sample points:

$$C_{i+1} = C_{i+1}/0.9$$

or, in all other cases:

$$C_{i+1} = C_{i+1}/(0.7+(0.33*(P_{i+1(c)} - P_{i+1}) - 1));$$

the equals term hereinabove indicating a substitution operation.

The method shown in FIG. 11 is repeated for all traces in the shot record, as suggested by test 108. As a result, the first break times $t_{fb}$ determined by the adaptive network are adjusted (when feasible) to fit the constraints set forth hereinabove, based on the first break points of the neighboring valid traces.

Figure 12:
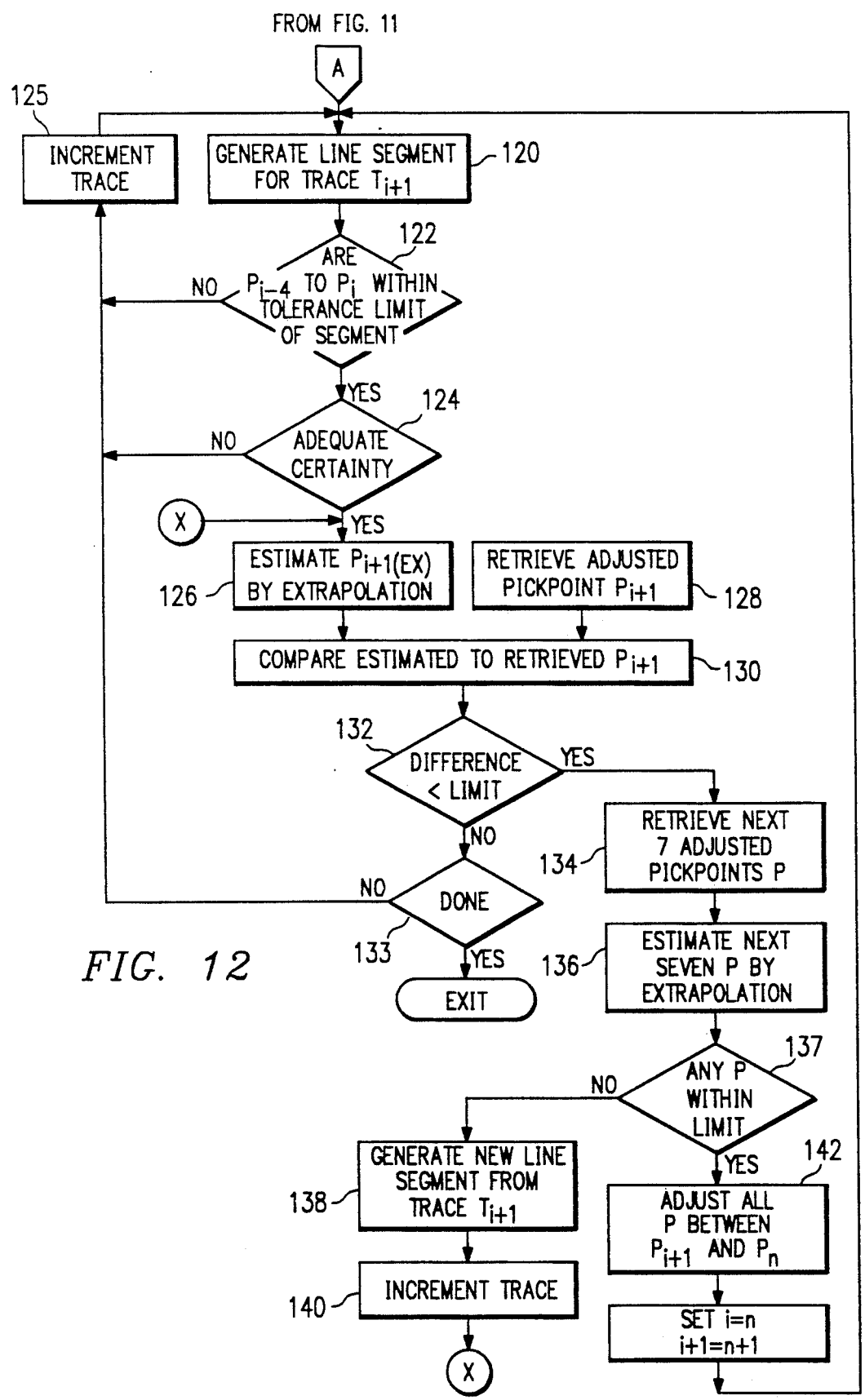

Referring now to FIG. 12, the second grouping of post-processing process 83 will now be described in detail. This grouping uses a predictive line segment detection method to combine sequences of adjusted first break points into line segments. The result of this second grouping is to provide a relatively well-behaved function of first-break points over the shot record, so that conventional methods of deriving a near-surface velocity model, and applying the model in making static corrections to the deep reflections, will provide more meaningful seismic data.

The second post-processing grouping begins with process 120, where an estimated line segment is determined for trace $T_{i+1}$ based on the first break points for the five valid preceding traces $T_i$ through $T_{i-4}$. This is preferably done by performing a linear extrapolation using the value of the pickpoint $P_i$ (i.e., the first break point $t_{fb}$ for trace $T_i$) and the mean of the five slopes M including those between each of the prior five pickpoints $P_{i-4}$ through $P_i$ plus the slope $M_i$ at pickpoint $P_i$.

The confidence in the line segment generated in process 120 is tested in tests 122 and 124 of the method shown in FIG. 12. Test 122 first compares the stored values of the pickpoints $P_{i-4}$ through $P_i$ against the line segment generated in process 120. If all of the five prior pickpoints $P_{i-4}$ through $P_i$ are not within a tolerance limit from the generated line segment (for example, three sample points), the generated line segment including trace $T_i$ will not be used, the trace for which the line segment is to be generated is incremented (process 125) to trace $T_{i+1}$ and process 120 is repeated for this next trace, ignoring prior trace $T_i$. Test 124, as in the case for the first grouping method of FIG. 11, determines if the average of the certainty values for the five pickpoints is adequate (i.e., greater than a certain value); if not, the trace is similarly incremented in process 125 and process 120 generates a new line segment.

If the line segment generated in process 120 is found valid by tests 122 and 124, an extrapolated pickpoint $P_{i+1(ex)}$ for the next trace $T_{i+1}$ is estimated in process 126 by linear extrapolation of the line segment. Process 128 retrieves the adjusted pickpoint value $P_{i+1}$ from memory, and the two are compared in process 130. If the difference between the adjusted pickpoint $P_{i+1}$ and the extrapolated pickpoint $P_{i+1(ex)}$ less than a certain threshold value, for example four sample points, the grouping concludes that pickpoint $P_{i+1}$ is a point on the same line segment as generated in process 120. If more traces remain to be analyzed (test 133), the trace is incremented, and the second grouping process begins again from process 120. If no more traces remain, as found by test 133, the pickpoints P in memory are suitable for use in determining the velocity model for the near-surface layer and for generating static corrections, according to the conventional manner, and the method according to this embodiment is exited.

If the difference between the extrapolated pickpoint $P_{i+1(ex)}$ and the adjusted pickpoint $P_{i+1}$ exceeds the threshold limit as found in test 132, the method according to this embodiment of the invention will examine further extrapolation of first break points past the generated line segment to determine if a new line segment (corresponding to a near-surface region of different velocity, for example) is appropriate. If a new line segment is not appropriate, meaning that certain of the pickpoints are in error, this method will adjust the pickpoints so as to better fit the line segment. In process 134, a series of pickpoints P past pickpoint $P_{i+1}$ (in this embodiment, the next seven pickpoints $P_{i+2}$ through $P_{i+8}$) are retrieved. Process 136 extrapolates the line segment generated in process 120 for the traces corresponding to these next seven pickpoints P, and test 137 determines if any of the pickpoints are sufficiently close to the extrapolated line segment for the next seven traces. If not, new line segment data is generated, in process 138, beginning with trace $T_{i+1}$ in the same manner as in process 120 described hereinabove. The trace of interest is incremented to the next trace $T_{i+2}$ (process 140) and the process begins again with the extrapolation of the next pickpoint in process 126 for the new line segment.

However, if one or more of the next seven pickpoints $P_{i+2}$ through $P_{i+8}$ are close to the extrapolated line segment as found by test 137, this method concludes that the pickpoint $P_{i+1}$ is most likely in error and should be further adjusted to fit the generated line segment. This is accomplished by determining the pickpoint $P_n$, nearest to pickpoint $P_{i+1}$, which is within the defined range from the extrapolated line segment. Process 142 adjusts all pickpoints $P_{i+1}$ through $P_n$ (inclusive) to the values of the peak on the respective traces $T_{i+1}$ through $T_n$ closest to the generated line segment, and stores these values in memory. Process 120 for generating the next line segment is then performed, for the trace $T_{n+1}$ based upon trace $T_n$ (corresponding to pickpoint $P_n$) set by process 142, from which point the method shown in FIG. 12 will continue until complete as described hereinabove.

Referring back to FIG. 6, it should be noted that while the above-described method increments the time of interest t from a point t prior to the first break time $t_{fb}$, alternatively the initial time of interest $t_0$ could be after the first break time $t_{fb}$, with the time of interest t decrementing by the amount $\Delta t$. The calculated first break time $t_{fb}$ would, in such an alternative method, correspond to the time t at which the outputs change state. In such an alternative, it would be preferable to define the output nodes 46, in the training of the network, so that OUT1 indicates with a "1" state that the time of interest t is at or earlier than the first break time $t_{fb}$, and so that a "1" state at line OUT0 indicates that the time of interest t is later than the first break time $t_{fb}$.

As a result of the method of FIG. 6, analysis of an entire shot record (arranged as a common shot gather in this example) for the first break times of the various traces 10 associated with the geophone groups P, is performed in an automated manner. The results of this analysis can be used to provide static correction in the conventional manner to account for the effect of the near-surface weathered layer.

It should be noted that many alternative arrangements and gathers of traces 10 may alternatively be analyzed according to the method described hereinabove, either in lieu of the common shot gather, or in addition to the common shot gather. For example, the trace data may be arranged as a common receiver gather, to determine the effects or differences of a particular geophone group P or its location, as the source moves along the surface during the survey. Further in the alternative, the traces may be gathered according to a common offset gather, with the distance from the geophone group P to the source location $X_s$ remaining constant for the traces being analyzed. By use of the automated technique described hereinabove, such redundant data can be put to beneficial use; prior manual techniques rarely analyzed such redundancies in the data, due to the inordinate manpower and time required.

Adaptive Network Training

The preferred methods of training a network such as network 50 to perform the above-described process, and other similar processes, will now be described in detail. As is evident from the description hereinabove, the network used according to the method of FIG. 6 must previously be "trained", i.e., the weighting factors $W_{ij}$ of the network must be set, so that the output appearing at nodes 46 corresponds closely to the true classification of the input data set applied to nodes 42. As is well known, adaptive, or neural, networks are particularly useful in the problems of recognizing and classifying input data sets which were previously not presented thereto, assuming that the weighting factors are properly assigned.

Figure 8:
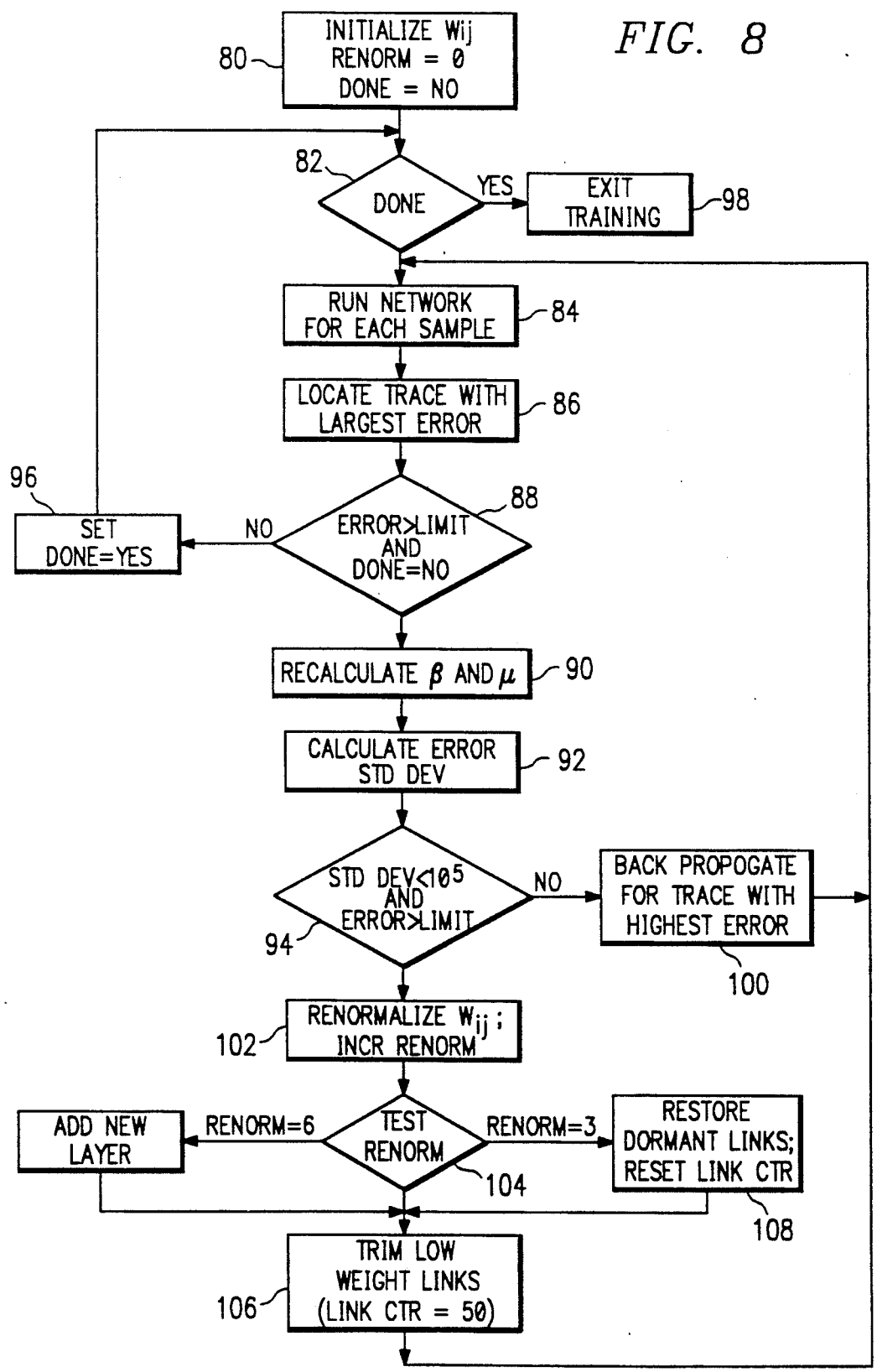
FIG. 8 is a flow diagram of a method of training an adaptive network according to the preferred embodiment of the invention.

Referring now to FIG. 8, a flow diagram for the preferred method of training network 50 of FIG. 4 will now be described. It is contemplated that the training method described hereinbelow can be readily programmed by one of ordinary skill in the art to run on conventional computing equipment from the description provided herein. Prior to the running of a computer program to set the weighting factors $W_{ij}$, as described hereinabove, certain sample inputs and outputs must be provided, such samples preferably manually selected. For the first break picking application, this is preferably done by an operator viewing a shot record, such as the common source gather of FIG. 2, and indicating for one or more traces 10 the first break point based upon the skill and experience of the operator. This is preferably done at a workstation, for example a DEC Workstation 3100, with the indication of the sample trace 10 and its first break point made by the operator setting a cursor at the first break point on the displayed shot record, and indicating to the workstation by way of a keystroke or mouse button that the cursor is at the first break location for the trace. As will be apparent hereinbelow, the operator preferably trains the network by providing an indication of first breaks for multiple traces, preferably three or more. After indicating the first break points, the operator can initiate the training program.

The training method begins, in process 80, with the initialization of certain parameters, including a renormalization counter RENORM which is initialized to the value 0, a DONE flag which is initialized to the value NO, and also the set of weighting factors $W_{ij}$ which are preferably set to random values in a limited range, for example between +0.25 and −0.25. It should also be noted that the initial network configuration selected at this point at the beginning of the training process is a two layer network, with the number of input nodes 42 corresponding to the number of bits of discretized digital data to be analyzed (120 bits for the example of FIG. 7b), with two output nodes 46 for selecting the two outputs discussed hereinabove for indicating the location of the first break time, and with no hidden layer nodes 44. As will be described hereinbelow, additional layers may be added according to this embodiment of the method, if the training reaches a slow convergence region. Decision block 82 checks the status of the DONE flag, exiting the training program if it has been set to YES. Since DONE is set to NO, the training will begin from process 84.

Figure 9:
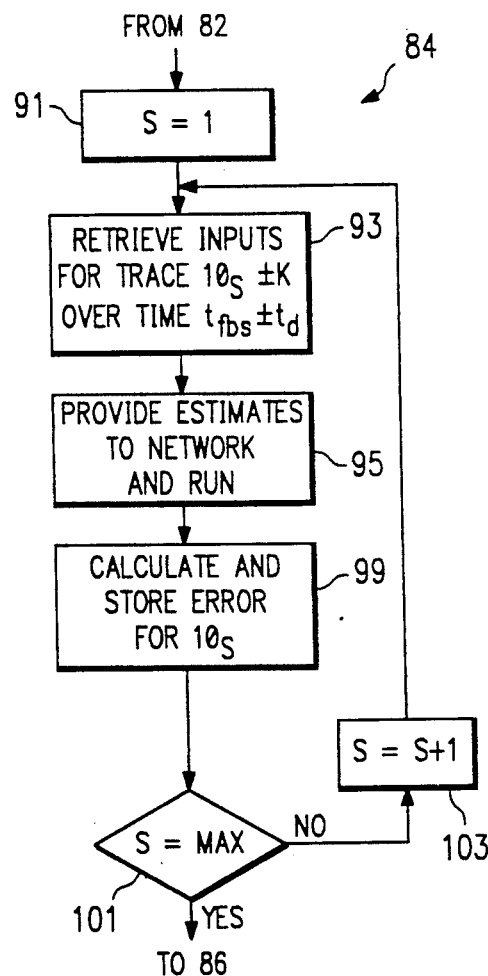
FIG. 9 is a flow diagram of a portion of the method of FIG. 8 in which sample traces are run.

At process 84, a run is performed by the network for each of the identified sample traces. FIG. 9 is a flow diagram, illustrating the operation of this portion of the training method in further detail. Process 84 first sets a counter S to the value 1, to operate on the first one of the sample traces 10, (a maximum value MAX is previously set, for example in initialization process 80, to the number of sample traces $10_s$ identified by the operator). For this embodiment, where the network is to analyze a first break time for a trace 10 as described hereinabove, the discretized data corresponding to the sample trace $10_s$ and k traces on either side thereof, for a period of time $\Delta d$ on either side of the first break time $t_{fbn}$ selected by the operator, are retrieved in process 93. The discretized data are presented to input nodes 42 of the network in process 95, in similar fashion as described hereinabove. The network, in its initial condition, operates on these inputs, and provides an output based on its weighting factors $W_{ij}$ as currently set. As a result of the operation of the network, values are presented by output nodes 46, corresponding to outputs OUT0 and OUT1. The values generated at output nodes 46 will generally consist of a fractional value, i.e., ranging between 0.000 and 1.000.

Since the time of interest is the first break time for this run of the network, the desired output is the value 1.000 for OUT0 and the value 0.000 for OUT1. The difference between the actual values of outputs OUT0 and OUT1 and these desired values, i.e., the error for each output node, is calculated in process 99 and stored in memory in a manner associated with sample trace $10_s$. In this embodiment of the invention, the cumulative error (i.e., the sum of the differences for OUT0 and OUT1) is also of interest, and is also stored.

In decision 101, the value of the counter S is compared against the value MAX, to determine if all sample traces $10_s$ have been run through the network. If all sample traces $10_s$ have not been run through the network, the counter S is incremented, and the set of discretized data for the new trace $10_s$ is retrieved and input to the network, beginning with process 93. If the value of counter S indicates that all sample traces $10_s$ have been run, the training process continues with process 86 of FIG. 8.

Process 86 begins a portion of the training method which is directed to the incremental training of the network. Conventional backpropagation methods for training adaptive networks apply a set of training examples to the network, such training examples corresponding to the sample traces $10_s$ in this method. In the conventional method, each training case is applied to the network, with the backpropagation adjustment of the weighting factors $W_{ij}$ performed after each run, until the error for the particular training case is below the tolerance limit. The next training example is then applied to the network, with backpropagation adjustment of the weighting factors $W_{ij}$ performed until the error for this training example is below the tolerance limit. The procedure of backpropagation for each training example continues for the training examples available.

Significant inefficiency in training according to such conventional backpropagation is overcome by the incremental training method according to this embodiment of the invention. The inefficiency in the conventional method results from its attempt to go from a highly disordered random initial state for the network to a highly ordered final solution space, in a relatively random manner (i.e., dependent upon the arbitrary order in which the training examples are presented to the network). In contrast, the method according to this embodiment of the invention locates the training example with the highest error, applies it to the network and performs the backpropagation accordingly. All sample traces 10 are then run according to the adjusted network, the largest error is compared against the limit, followed by backpropagation of the worst sample trace $10_s$, until the error for the worst sample is within the tolerance limit.

Referring to FIG. 8, process 86 retrieves the error values calculated from the runs of process 84 on each of the sample traces $10_s$, and locates the sample trace $10_s$ with the highest error. In decision 88, this highest error is compared against the tolerance limit; if the highest error is below the tolerance limit, the flag DONE is set to YES in process 96, and the training is exited via decision 82 and process 98. If the highest sample trace error is above the tolerance limit, the backpropagation process according to this embodiment of the invention will be performed for this sample trace $10_s$.

As described hereinabove, the generalized delta rule as used for backpropagation includes a learning factor $\beta$ and a momentum factor $\mu$. In prior backpropagation methods, these two constants have been experimentally determined for particular network types prior to the training process, and held constant at these values throughout the training process. However, it has been found that the determination of optimal values for these factors prior to the training process is relatively difficult, as the optimum value can vary depending upon the rate of change of the weighting factors $W_{ij}$ and upon the particular network configuration (which itself changes, according to this embodiment, as will be described in detail hereinbelow). According to this embodiment of the invention, however, process 90 includes a recalculation of these two factors based on the error for the iteration.

In the backpropagation method, the higher the value of $\beta$ and $\mu$, the greater the change in the weighting factors $W_{ij}$ from iteration to iteration. Accordingly, the likelihood of reaching a slow convergence region, such as a local minimum, increases with higher values of these factors, but the rate of convergence decreases with lower values of these factors. According to this embodiment of the invention, the learning factor $\beta$ is set to a low value when the error is high, to avoid slow convergence regions. Conversely, as the error value is relatively low, the value of the learning factor $\beta$ may be set quite high, since the likelihood of reaching a slow convergence region is relatively low when the network is close to its desired state. In this embodiment of the invention, the momentum factor $\mu$ is set according to a time-averaged function of $\beta$, as will be described in detail hereinbelow, such that the momentum factor $\mu$ will have a large value once the learning factor $\beta$ has reached a stable large value. Higher values of factors $\beta$ and $\mu$ also allow for rapid convergence in the situation where the error is low (and where change in the weighting factors becomes very small from iteration to iteration).

The value of the learning factor $\beta$ is calculated in process 90 in this embodiment of the invention as follows:

$$\beta = [1 - (\text{maximum output node error})]$$

The current momentum factor $\mu$ is calculated based on the current learning factor $\beta$, and on the previous momentum factor value $\mu_{prev}$, as follows:

if $\mu_{prev} > \beta$:

$$\mu = [2\mu_{prev} + \beta]/3$$

if $\mu_{prev} \leq \beta$:

$$\mu = [2\beta + \mu_{prev}]/3$$

It should be noted that the quantity subtracted from unity in the above calculation of learning factor $\beta$ is not the total error for the worst sample trace $10_s$ (which is the sum of the errors of the output nodes 46), but is the higher of the errors for the two output nodes 46 in the network according to this embodiment. This is because the sum of the errors could cause the learning factor $\beta$ to become negative, making the backpropagation erroneous.

Therefore, the method according to this embodiment of the invention performs dynamic adjustment of the learning and momentum factors $\beta$ and $\mu$, so that the learning rate (i.e., the rate at which the weighting factors $W_{ij}$ are changed from iteration to iteration) is relatively low when output node error is high, thus reducing the likelihood that the backpropagation will reach a slow convergence region. Once the output error becomes low, the learning rate increases so that convergence to an acceptable error limit occurs faster for those cases where slow convergence is less likely (i.e., the current result is close to the desired result). This dynamic adjustment of the factors $\beta$ and $\mu$ thus improves the backpropagation efficiency not only in the incremental training method of this embodiment of the invention, but also in conventional backpropagation methods as well.

The training method according to this embodiment of the invention next determines if the training has reached a slow convergence region. As will be described in further detail hereinbelow, this method includes steps for escaping a slow convergence region. Process 92 calculates the standard deviation of the error value for the worst sample trace $10_s$ over the most recent runs of process 84, for example over the last twenty runs. If the standard deviation of the error is extremely small, for example below $10^{-5}$, but the error is still above the tolerance limit (i.e., the result of decision 88 is NO), it may be concluded that the network is in a slow convergence region, converging on an incorrect set of weighting factors $W_{ij}$ (in the case of a local minimum), or converging at an infinitesimal rate. As noted above, the methods for escaping such a situation will be described in further detail hereinbelow.

If the network is not in a slow convergence region, backpropagation with the new values of factors $\beta$ and $\mu$ will now be performed for the network according to the results of the sample trace $10_s$ with the worst error. This is performed in process 100 according to the well-known generalized delta rule, as described above. In this embodiment of the invention, process 100 preferably calculates the error terms, for purposes of backpropagation, differently than the conventional backpropagation method.

As described hereinabove, conventional adjustment of the weighting factors is performed as follows:

$$W_{ij}(t+1) = W_{ij}(t) + \beta\epsilon_i I_{ij} + \mu[W_{ij}(t) - W_{ij}(t-1)]$$

where $\epsilon_i$ is an error term defined, for an output node 46, by:

$$\epsilon_i = \Omega_i(1-\Omega_i)(D_i-\Omega_i)$$

where $D_i$ is the desired output for the input presented. According to the conventional backpropagation method for the example of first break picking, the desired output is 1.00 for OUT0 and 0.00 for OUT1. It has been observed, however, that this setting of the desired outputs $D_i$ encourages some of the weighting factors $W_{ij}$ to grow to large values during the iterative training process. A wide disparity in the weighting factors $W_{ij}$, caused by certain of the weighting factors $W_{ij}$ being very large, results in slow convergence. Such slow convergence especially affects the incremental training approach of this embodiment of the invention, where the network is trained according to the worst sample case first. Accordingly, in this embodiment of the invention, the desired outputs $D_i$ are not set to their true value during the application of the generalized delta rule, but are set to less extreme values. For example, the desired output $D_0$ for OUT0 may be set to 0.800, and the desired output $D_1$ for OUT1 may be set to 0.200. This adjustment of the desired outputs $D_i$ for the generalized delta rule backpropagation has been observed to also improve the efficiency of the network in reaching convergence.

After the backpropagation of process 100 which recalculates the weighting factors $W_{ij}$, the weighting factors $W_{ij}$ are stored in memory, and the method continues with the next iteration of process 84, performed on all sample traces $10_s$ with the new weighting factors $W_{ij}$ adjusted based upon the worst sample trace. If the network does not enter a slow convergence region, the above-described processes will be iteratively repeated until the highest sample trace error is below the tolerance limit (i.e., the result of decision 88 is NO), in which case the training method will be complete.

According to this incremental training approach, significant improvement in training efficiency may be obtained. Since the backpropagation is performed for the sample trace $10_s$ with the highest error after each set of runs in process 84, the training method tends not to perform time-consuming backpropagation based upon sample traces $10_s$ that have low error, as such traces do not adjust the weighting factors $W_{ij}$ to a significant degree. This method is also especially useful in the first break picking method, where the sample traces $10_s$ generally resemble one another. The adjustment of the weighting factors $W_{ij}$ for one of the traces will tend to apply to the other sample traces $10_s$ due to this resemblance, and accordingly redundant backpropagation is not performed. Furthermore, the incremental training method according to this invention presents higher error cases to the network more frequently than small error cases, which further reduces convergence time.

Returning to FIG. 8, if a slow convergence region is detected in decision 94, the training method according to this embodiment of the invention includes a number of techniques for escaping the slow convergence region. A first technique is the renormalization of all weighting factors $W_{ij}$.

It has been observed that the likelihood of reaching a slow convergence region is increased by certain conditions in the set of weighting factors $W_{ij}$. These conditions include the state where certain of the weighting factors $W_{ij}$ have reached an excessively large value, and also include the state where one or more of the weighting factors $W_{ij}$ oscillate between two values on successive iterations. According to this embodiment of the invention, process 102 normalizes all of the weighting factors $W_{ij}$ to within a small range, for example to within a range of 0.500 from least to greatest value, with the relative values of the weighting factors $W_{ij}$ retained, but within a smaller range. Process 102 also increments the value of the renormalization counter RENORM by one, so that further, more drastic, steps may be taken later if the renormalization of process 102 is unsuccessful.

Decision 104 then tests the value of the counter RENORM. If the value is neither three or six, in this embodiment (indicating neither the third or sixth renormalization), the more drastic steps are not taken at this time. Process 106 is then performed in this embodiment, where links in the network which have retained low weights are cut.

It has been found that for certain problems, such as first break picking, a number of links within the network will have low weighting factors $W_{ij}$ for a number of iterations. Performing the backpropagation process for such weighting factors, with no adjustment resulting therefrom, is quite inefficient. Accordingly, process 106 retrieves the set of weighting factors $W_{ij}$ for the network, and determines which (if any) of the weighting factors $W_{ij}$ are below a certain threshold value (for example, below 0.001). If an individual weighting factor $W_{ij}$ is below the threshold value, a link counter for this factor is interrogated. If the value of the link counter is at or above a limit, such as fifty, process 106 sets the value of the weighting factor to zero, and eliminates it from further adjustment via backpropagation.

It should be noted that the link counter is preferably incremented during the backpropagation process 100, as the number of times that process 106 is performed depends upon the number of times that the network reaches a slow convergence region. It should also be noted that, if the backpropagation of process 100 establishes a value for a weighting factor $W_{ij}$ which is greater than the threshold limit, the link counter should be reset to zero, as it is preferred that the link be trimmed only if it has been excessively low for a number of consecutive iterations.

The trimming of such dormant links, i.e., those with continually low values, has been found to greatly improve the training efficiency of the method according to this embodiment of the invention. In addition, while process 106 for trimming dormant links is performed after renormalization of process 102 when a slow convergence region is detected, alternatively the link trimming of process 106 could be performed immediately after the backpropagation of process 100, or at some other time in the major loop of the flow of FIG. 8.

After the renormalization of the weighting factors $W_{ij}$ of the network, and the trimming of dormant links (if any) of process 106, the training method of this embodiment of the invention continues for new runs of the network for the sample traces $10_s$ in process 84. If the renormalization of weighting factors $W_{ij}$ was successful in dislodging the network from the slow convergence region, the training will result in convergence at the proper set of values for weighting factors $W_{ij}$.

However, if merely the renormalization of process 102 is insufficient to cause escape from the slow convergence region, i.e., if the result of decision 94 remains YES for two passes, the value of the RENORM counter will equal three. The result of decision 104 which tests the value of the counter RENORM will cause the method of this embodiment of the invention to perform the restoration of previously trimmed links in process 108. It may be possible that the link trimming of process 106, if done prematurely for some links, may have reduced the complexity of the network to a level below that necessary to converge on the proper solution, so that the network reaches a slow convergence region. Accordingly, process 108 (on the third renormalization of weighting factors $W_{ij}$) restores all previously trimmed links to the value of the weighting factor $W_{ij}$ which it last had, and resets the link counter to zero for these restored links. Control then passes to process 106, where new dormant links are trimmed, and the network returns to process 84 for the next run of sample traces $10_s$.

In the event that numerous renormalization operations and the restoring of dormant links still does not sufficiently adjust the network to avoid the slow convergence region, it is likely that the network is not sufficiently complex to solve the problem of first break picking to within the desired error tolerance (i.e., the least amount of error achievable by the network is too high). As noted hereinabove, the method according to this embodiment of the invention begins with a network which is a two-level network, having only input nodes 42 and two output nodes 46.

If the result of test 104 determines that the counter RENORM has the value of six, indicating that the network has reached a slow convergence region six times, process 110 is performed in which a new layer is added to the network. This is accomplished by adding two new output nodes 46, so that the prior output nodes 46 become hidden layer nodes 44. In addition, as shown for network 50 of FIG. 4 and as described hereinabove, it is preferred that links 48 between each of the input nodes 42 and the new output nodes 46 be established, to provide additional flexibility for the network, and to speed convergence to the proper set of weighting factors $W_{ij}$. After addition of the new layer in process 110, dormant links are again trimmed in process 106, and the training process begins again from process 84.

According to the embodiment of the training method described hereinabove, an adaptive or neural network may be generated which has its organization determined dynamically, as a result of the training process, in which layers may be added as necessary, with links which skip hidden layers in the network, and in which dormant links are trimmed. The resulting network thus quickly is established which is particularly adapted to the classification problem at hand, for example the first break picking problem described hereinabove.

Upon completion of the training process of FIG. 8, the network is ready for the analysis of a full shot record as described hereinabove. It should be noted that, upon the application of a full shot record to the network, the results of the automated first break picking may, in the opinion of the operator, not be adequate for individual traces, or a group of traces, in the shot record. Accordingly, after performing the analysis of the shot record, it is preferred that the computing equipment be programmed in such a manner that the operator can pick new sample traces $10_s$ in the portions of the shot record where the first break picking was not as successful as desired, after which training of the network according to the method of FIG. 8 may again be performed. It should be noted that the incremental training method described hereinabove relative to FIG. 8 is especially advantageous for such iterative and interactive training of the network.

Furthermore, as described hereinabove, the ability of the adaptive network, according to the described embodiment of the invention, to perform first break picking by using multiple trace data provides significant advantages over manual first break picking. The establishing of a velocity model for the seismic survey for determining static correction thereof is significantly improved both in efficiency and in accuracy. Furthermore, due to the efficient automated performance of first break picking as described above, data grouping such as common receiver or common offset gathers may be used in conjunction with the common source gather, in order to further analyze the near-surface effects, and to more accurately establish the static corrections; due to the cumbersome nature of manual first break picking, such analysis has previously been available but was seldom utilized in the past.

While the invention has been described herein relative to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as claimed hereinbelow.

We claim:

1. A method for operating an adaptive network to determine a first break in recorded seismic data comprising:

operating a seismic source to generate seismic vibrations;

detecting said seismic vibrations at a plurality of surface locations;

recording the detected seismic vibrations as a plurality of traces;

storing data representing said plurality of traces in a memory;

retrieving a selected portion of said stored data representing a first trace corresponding to vibrations detected at a first surface location, and in which a first break occurs, and a plurality of neighboring traces corresponding to vibrations detected at a plurality of surface locations near said first surface location and in substantially the same direction from said seismic source as said first surface location, over a period of time including an analysis time;

presenting said retrieved selected portion of said stored data to input nodes of said adaptive network;

operating said adaptive network to produce an output indicating whether or not the analysis time corresponds to the time at which said first break occurs in said first trace;

responsive to the output of said adaptive network indicating that the analysis time does not correspond to the time at which said first break occurs in said first trace, adjusting said analysis time; and repeating said retrieving, presenting and operating steps for a portion of said stored data representing said first trace and said plurality of neighboring traces over a period of time including the adjusted analysis time.

2. The method of claim 1, wherein the analysis time in said retrieving step corresponds to a point in time prior to the time at which said first break occurs;

and wherein said adjusting step increments said analysis time to a later point in time along said first trace and neighboring traces.

3. The method of claim 2, wherein the portion of said stored data retrieved in said retrieving step is centered about said analysis time.

4. The method of claim 1, wherein the portion of said stored data retrieved in said retrieving step is centered about said first trace.

5. The method of claim 1, further comprising, responsive to the output of said adaptive network indicating that the analysis time corresponds to the time at which said first break occurs in said first trace;

retrieving a portion of said stored data representing a second trace corresponding to vibrations detected at a second surface location, and in which a first break occurs, and a second plurality of neighboring traces corresponding to vibrations detected at a plurality of surface locations near said second surface location and in substantially the same direction from said seismic source as said second surface location, over a period of time including an analysis time;

presenting said retrieved portion of said stored data to input nodes of said adaptive network, said adaptive network presenting an output indicating that the analysis time corresponds to the time at which said first break occurs in said second trace;

responsive to the output of said adaptive network indicating that the analysis time does not correspond to the time at which said first break occurs in said second trace, adjusting said analysis time; and repeating said retrieving and presenting steps for a portion of said stored data representing said second trace and said plurality of neighboring traces over a period of time including the adjusted analysis time.

6. The method of claim 5, wherein said first trace is one of said second plurality of neighboring traces.

7. The method of claim 1, wherein said storing step comprises:

arranging said data representing said plurality of traces as a bit-mapped display; and storing said bit-mapped display arrangement in said memory.

8. The method of claim 7, wherein said data representing said plurality of traces comprises sampled amplitudes of said traces;

and further comprising:

assigning a digital value to each of said sampled amplitudes in said data representing said plurality of traces, said digital values for a trace corresponding to a graphical representation of the trace;

and wherein said presenting step presents each bit of said digital values to an input node of said adaptive network.

9. The method of claim 8, wherein said retrieving step retrieves the data bits associated with the portion of said stored data;

and wherein said presenting step presents the retrieved data bits to the input nodes of the adaptive network.

10. The method of claim 1, further comprising:

prior to said operating step, setting weighting factors in said adaptive network according to a backpropagation method.

* * * * *